US011203167B2

(12) United States Patent
Garm

(10) Patent No.: US 11,203,167 B2
(45) Date of Patent: Dec. 21, 2021

(54) JOINING METHOD FOR WIND TURBINE BLADE SHELLS

(71) Applicant: LM WP PATENT HOLDING A/S, Kolding (DK)

(72) Inventor: Jesper Hasselbalch Garm, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 723 days.

(21) Appl. No.: 15/033,944

(22) PCT Filed: Nov. 5, 2014

(86) PCT No.: PCT/EP2014/073779
§ 371 (c)(1),
(2) Date: May 3, 2016

(87) PCT Pub. No.: WO2015/067637
PCT Pub. Date: May 14, 2015

(65) Prior Publication Data
US 2016/0279867 A1 Sep. 29, 2016

(30) Foreign Application Priority Data
Nov. 6, 2013 (EP) ..................................... 13191730

(51) Int. Cl.
B29C 65/00 (2006.01)
B29C 65/50 (2006.01)
(Continued)

(52) U.S. Cl.
CPC ............ *B29C 66/54* (2013.01); *B29C 65/483* (2013.01); *B29C 65/5014* (2013.01);
(Continued)

(58) Field of Classification Search
CPC ... B29C 66/54; B29C 65/5014; B29C 65/505; B29C 66/12261; B29C 66/721;
(Continued)

(56) References Cited

U.S. PATENT DOCUMENTS 8,876,482 B2 * 11/2014 Murdock .................. F01D 5/28
416/229 R
2007/0036659 A1 * 2/2007 Hibbard .................. B29C 63/22
416/233
(Continued)

FOREIGN PATENT DOCUMENTS

EP 2 325 478 A2 5/2011
EP 2 626 196 A1 8/2013
(Continued)

OTHER PUBLICATIONS

International Search Report dated Jan. 23, 2015 issued in International Application No. PCT/EP2014/073779.

Primary Examiner — Richard A Edgar
Assistant Examiner — Aye S Htay
(74) Attorney, Agent, or Firm — Nath, Goldberg & Meyer; Jerald L. Meyer; Tanya E. Harkins

(57) ABSTRACT

A method of manufacturing a wind turbine blade is described, the blade being formed from at least a pair of blade shells being joined together. For at least a portion of the wind turbine blade, the blade shells are joined by an overlamination applied between the edges of the blade shells, thereby substantially reducing or eliminating the need for a structural adhesive to join the blade shells, particularly in the area of the leading edge of the blade or the root region of the blade trailing edge. The overlamination can be formed from the same material as the blade shells themselves, thereby minimising the possibility of structural faults or
(Continued)

cracks due to differences in materials or stiffness levels at the interface between the blade shells.

19 Claims, 5 Drawing Sheets

(51) Int. Cl.
| | | |
|---|---|---|
| *F03D 1/06* | (2006.01) | |
| *B29C 70/30* | (2006.01) | |
| *B29D 99/00* | (2010.01) | |
| *F03D 13/10* | (2016.01) | |
| *B29C 65/48* | (2006.01) | |
| B29L 31/08 | (2006.01) | |
| B29C 65/52 | (2006.01) | |

(52) U.S. Cl.
CPC ...... *B29C 65/5042* (2013.01); *B29C 66/1226* (2013.01); *B29C 66/12261* (2013.01); *B29C 66/721* (2013.01); *B29C 66/723* (2013.01); *B29C 70/30* (2013.01); *B29D 99/0028* (2013.01); *F03D 1/0675* (2013.01); *F03D 13/10* (2016.05); B29C 65/505 (2013.01); B29C 65/5021 (2013.01); B29C 65/52 (2013.01); B29C 66/02241 (2013.01); B29C 66/02245 (2013.01); B29C 66/221 (2013.01); B29C 66/223 (2013.01); B29C 66/71 (2013.01); B29C 66/727 (2013.01); B29C 66/7212 (2013.01); B29C 66/72329 (2013.01); B29L 2031/085 (2013.01); F05B 2280/6003 (2013.01); Y02E 10/72 (2013.01); Y02P 70/50 (2015.11)

(58) Field of Classification Search
CPC ..... B29C 66/723; B29C 70/30; F03D 1/0633; F03D 1/0641; F03D 1/065; F03D 1/0675; F03D 1/0683

See application file for complete search history.

(56) References Cited

U.S. PATENT DOCUMENTS

| | | | |
|---|---|---|---|
| 2008/0069699 A1* | 3/2008 | Bech | B29C 66/20 416/229 R |
| 2008/0075603 A1* | 3/2008 | Van Breugel | B29C 65/1483 416/232 |
| 2008/0107540 A1* | 5/2008 | Bonnet | F03D 1/0675 416/229 R |
| 2009/0146433 A1 | 6/2009 | Althoff et al. | |
| 2011/0206534 A1* | 8/2011 | Riahi | F03D 1/0675 416/241 R |
| 2011/0229336 A1 | 9/2011 | Richter et al. | |
| 2012/0061007 A1* | 3/2012 | Gunther | F03D 1/0675 156/94 |
| 2012/0141277 A1* | 6/2012 | Yarbrough | F03D 80/30 416/146 R |
| 2012/0301316 A1* | 11/2012 | Velez Oria | B29C 66/131 416/233 |
| 2013/0129518 A1* | 5/2013 | Hayden | F03D 1/0675 416/226 |
| 2013/0224032 A1* | 8/2013 | Busbey | F03D 1/0633 416/223 R |
| 2016/0123298 A1* | 5/2016 | Caruso | F03D 1/0675 416/61 |
| 2017/0058863 A1* | 3/2017 | Yarbrough | F03D 80/50 |

FOREIGN PATENT DOCUMENTS

| | | |
|---|---|---|
| WO | 2004/076852 A2 | 9/2004 |
| WO | 2013001458 A2 | 1/2013 |

* cited by examiner

JOINING METHOD FOR WIND TURBINE BLADE SHELLS

This is a National Phase Application filed under 35 U.S.C. 371 as a national stage of PCT/EP2014/073779, filed Nov. 5, 2014, an application claiming the benefit of European Application No. 13191730.4, filed Nov. 6, 2013, the content of each of which is hereby incorporated by reference in its entirety.

FIELD OF THE INVENTION

The present invention relates to a system and method for joining sections of wind turbine blades, in particular for joining wind turbine blade shells to form a wind turbine blade.

BACKGROUND OF THE INVENTION

Wind turbine blades are generally made from composite materials, in particular glass and/or carbon fibre material which is infused with a resin and cured to form a solid structure.

A known approach to wind turbine blade manufacturing is to form separate blade shell sections. Such shells are formed by the arrangement of layers of fibre material in suitably-shaped moulds which are infused with a resin which is subsequently cured. The solid blade shells can then be adhered together to form a larger wind turbine blade structure. Such shells are traditionally formed as half-portions of a wind turbine blade, e.g. a first shell corresponding to an upwind- or pressure-side of a wind turbine blade and a second shell corresponding to a downwind- or suction-side of a wind turbine blade.

The shells are joined by an adhesive applied at the interface between the shells, typically along the edges of the shells, which are then brought into contact with each other and allowed to cure. An example of a prior art bonding between blade shells is shown in FIG. 5, where an adhesive 100 is located between the edges of upper and lower blade shells 102, 104 along the leading edge 106 of the blade.

In order to improve the bonding between shells along such adhesive lines, additional adhesive flanges 108 may be provided as part of the shells to retain adhesive within the bond area between the blade shells. The adhesive flanges 108 are normally located on the interior of the blade, possibly as part of one of the blade shells 102, 104, such that as the shells are brought together, the adhesive flange 108 is positioned on the internal side of the bond line between the edges of the shells 102, 104, to catch and collect any excess adhesive 110 which may be squeezed between the shell edges into the blade interior.

Once the shells have adhered to each other along the bond area, additional finishing operations may be required in order to provide a smooth outer surface in the area of the bond line between the blade shells. Such finishing operations may comprise a grinding or polishing of the external surface of the bond line, and/or an overlamination 112 of the bond line to provide for an aerodynamically suitable external surface.

The adhesives used in such bonding areas add considerable weight and cost to the final blade structure. In addition, the use of such adhesives can result in the formation of structural cracks or faults in the finished blade, due to the differences in material composition and associated stiffness between the fibre composite-based blade shells and the adhesive used in the bond lines.

It is an object of the invention to provide a system and method for the joining of wind turbine blade sections which addresses the above problems, in particular providing reduced weight and adhesive use for a wind turbine blade, while improving the performance of bonding areas in wind turbine blades.

SUMMARY OF THE INVENTION

Accordingly, there is provided a method of manufacturing at least a portion of a wind turbine blade, wherein the method comprises the steps of:
  providing a first blade shell having a first edge,
  providing a second blade shell having a second edge, and
  joining said first blade shell to said second blade shell along at least a portion of said first edge and said second edge by providing an overlamination extending between said first edge and said second edge.

The overlamination replaces the use of structural adhesive at the edge between the blade shells. A structural adhesive is understood to be an adhesive that can be used to produce a load-bearing joint.

Preferably, the overlamination is applied to external surfaces of said first edge and said second edge. Locating the overlamination on external surfaces of the blade allows for ease of application of the overlamination to secure the blade shells together. In addition, the overlamination can be easily inspected after application to ensure that the overlamination has been adequately applied, and acts to join the blade shells together.

The overlamination will be understood as a matrix of fibre material and a resin. Preferably, the overlamination is formed from the same material as the blade shells.

It will be understood that the join between said portion of said first edge and said second edge is substantially formed without a structural adhesive. Rather, the join is formed by using resin to secure the overlamination to the blade shells. As substantially no structural adhesive is used between said portion of said first edge and said second edge, accordingly the blade shells are joined using the overlamination.

Preferably, along said portion of said first edge and said second edge, the blade shells are joined solely using the overlamination, wherein no additional adhesive or glue is used along said portion of said first edge and said second edge.

Accordingly, the weight and cost of the wind turbine blade may be minimized, due to the reduced need for structural adhesive joints. Additionally, the overlamination may be selected such that the overlamination material has substantially similar material and stiffness properties to the blade shells, thereby reducing the likelihood of structural faults or cracks due to different material or stiffness properties.

Preferably, said first and second blade shells are arranged wherein a recess is defined at the interface between said first edge and said second edge, and wherein said overlamination is received at least partly within said recess.

By providing the overlamination within a recess in the blade shells, accordingly the aerodynamic profile of the finished wind turbine blade may be preserved as the overlamination and the associated recess can be dimensioned to comply with the desired airfoil profile.

There is further provided a method of manufacturing at least a portion of a wind turbine blade, wherein the method comprises the steps of:
  providing a first blade shell having a first tapered section along at least a portion of an edge of said first shell;

providing a second blade shell having a second tapered section along at least a portion of an edge of said second shell;

bringing together said first and second blade shells such that said first tapered section abuts said second tapered section to form a recess channel located along a boundary between the edges of said first and second blade shells; and applying a laminate in said recess channel to join said first and second blade shells.

As the recess may be formed from tapered edges of the blade shells, such tapering can be formed during manufacture of the blade shells themselves, e.g. by the selection of suitably-profiled blade moulds. Additionally or alternatively, such tapering may be provided by a cutting or grinding of the edges of the blade shells. By a tapered section, it will be understood that such tapering may comprise an even tapering or a stepped tapering, and such tapering may extend through the entire thickness of the blade shell, or may extend to a certain depth through the blade shell wall.

Preferably, said laminate is arranged to substantially fill said recess channel.

In one aspect, the maximum thickness of said laminate is substantially equal to the thickness of said first and second blade shells adjacent said edges.

By having the laminate as the same depth as the shell thickness, the aerodynamic profile of the airfoil profile of the designed blade is preserved through the use of the laminate at the interface between the shells.

Preferably, the blade shells are formed from a layup of a plurality of layers of fibre material, e.g. glass fibre, carbon fibre, etc., wherein said tapered section comprises a tapering through the body of the blade shell to a single layer or ply of fibre material.

Preferably, said laminate is applied such that the exposed surface of the laminate is substantially flush with the exposed surfaces of the first and second blade shells adjacent said recess channel.

The arrangement of the laminate in this manner provides for a smooth aerodynamic profile for the external surface of the blade in the region of the overlamination.

In a preferred aspect, said first and second tapered sections are located along the leading edges of respective said first and second blade shells.

Preferably, said step of applying a laminate comprises arranging said laminate in said recess channel to complete the aerodynamic profile along the leading edge boundary between said first and second blade shell portions.

In an additional or alternative aspect, said first and second tapered sections are located along the respective trailing edges of said first and second blade shells, preferably the trailing edges adjacent the root and of said first and second blade shells.

Preferably, the method comprises the step of providing a laminate or overlamination formed from substantially the same material as said first and second blade shells.

By providing the laminate from the same material as the blade shells, accordingly there is no difference in the stiffness properties between the blade shells and the laminate. Such a selection of material considerably reduces the possibility of structural crack formation due to stiffness variations along bond lines between shells.

In one aspect, the blade shells are at least partly formed from a matrix of a fibre-composite laminate material and a cured resin.

Preferably, said step of applying a laminate or providing an overlamination comprises:

positioning at least one layer of fibre material along at least a portion of said first edge and said second edge of said blade shells, preferably in said recess channel;

infusing said at least one layer of fibre material with a resin; and curing said resin to bond said first and second blade shells.

The step of infusing may comprise applying resin to surface of fibre material, e.g. roller application, vacuum infusion, etc. Alternatively, the step of applying a laminate may comprise positioning a precast laminate piece in said recess channel, and attaching said laminate piece in said recess channel. It will be understood that the resin may be any resin suitable for use in a composite structure, preferably at least one of, or a combination of, the following: polyester, vinyl ester, polyurethane, epoxy.

In one aspect, the method further comprises the step of treating the external surface of the laminate, such that the laminate is flush with the adjacent external surface of the first and second blade shells. The step of treating may comprise any surface treatment suitable for producing an aerodynamically smooth surface substantially free from defects, for example a polishing operation.

In one aspect, said steps of providing first and second blade shells may comprise forming at least one of said first and second blade shells in a blade shell mould, wherein said first and/or second tapered section is defined in said mould.

In one aspect, a blade shell mould is provided having a tapered section defined in the surface profile of the mould. In an alternative aspect, a tapered section is defined using a mould insert In an additional or alternative aspect, said steps of providing first and second blade shells may comprise forming a tapered section along at least a portion of an edge of a blade shell by performing a machining operation on said blade shell. Said machining operation may comprise grinding, cutting, etching, polishing, etc.

There is further provided a wind turbine blade comprising:

a first blade shell, and
a second blade shell,
wherein for at least a portion of a boundary between said first and second blade shells, said first and second blade shell portions are joined by an overlamination.

The overlamination is applied to external surfaces of said first and second blade shells.

It will be understood that said at least a portion of a boundary between said first and second blade shells is provided substantially without structural adhesive.

Preferably, said first and second blade shell portions are joined solely by an overlamination.

Preferably, there is provided a wind turbine blade comprising:

a first blade shell having a first tapered section along at least a portion of an edge of said first shell; and
a second blade shell having a second tapered section along at least a portion of an edge of said second shell,
wherein said first and second blade shells are arranged such that said first tapered section abuts said second tapered section to form a recess channel located along a boundary between the edges of said first and second blade shells, and
wherein the wind turbine blade further comprises a laminate located in said recess channel, said laminate joining said first and second blade shells.

Preferably, said laminate is formed from substantially the same material as said first and second blade shells.

Preferably, said laminate comprises at least one layer of fibre material and a cured resin.

Preferably, the wind turbine blade comprises a recess channel extending along at least a portion of the leading edge of said wind turbine blade, preferably along substantially all of the leading edge, wherein a laminate is located in the leading edge recess channel and joins said first and second blade shells along said at least a portion of the leading edge of said wind turbine blade.

Additionally or alternatively, the wind turbine blade comprises a recess channel extending along at least a portion of the trailing edge of the wind turbine blade, wherein a laminate located in the trailing edge recess channel joins and said first and second blade shells along said at least a portion of the trailing edge of said wind turbine blade.

Preferably, said trailing edge recess channel extends along the trailing edge in the root region of the wind turbine blade, wherein the laminate joins said first and second blade shells along the trailing edge in the root region of the wind turbine blade.

There is further provided a wind turbine comprising at least one wind turbine blade as described above.

DESCRIPTION OF THE INVENTION

An embodiment of the invention will now be described, by way of example only, with reference to the accompanying drawings, in which.

It will be understood that elements common to the different embodiments of the invention have been provided with the same reference numerals in the drawings.

Figure 1:
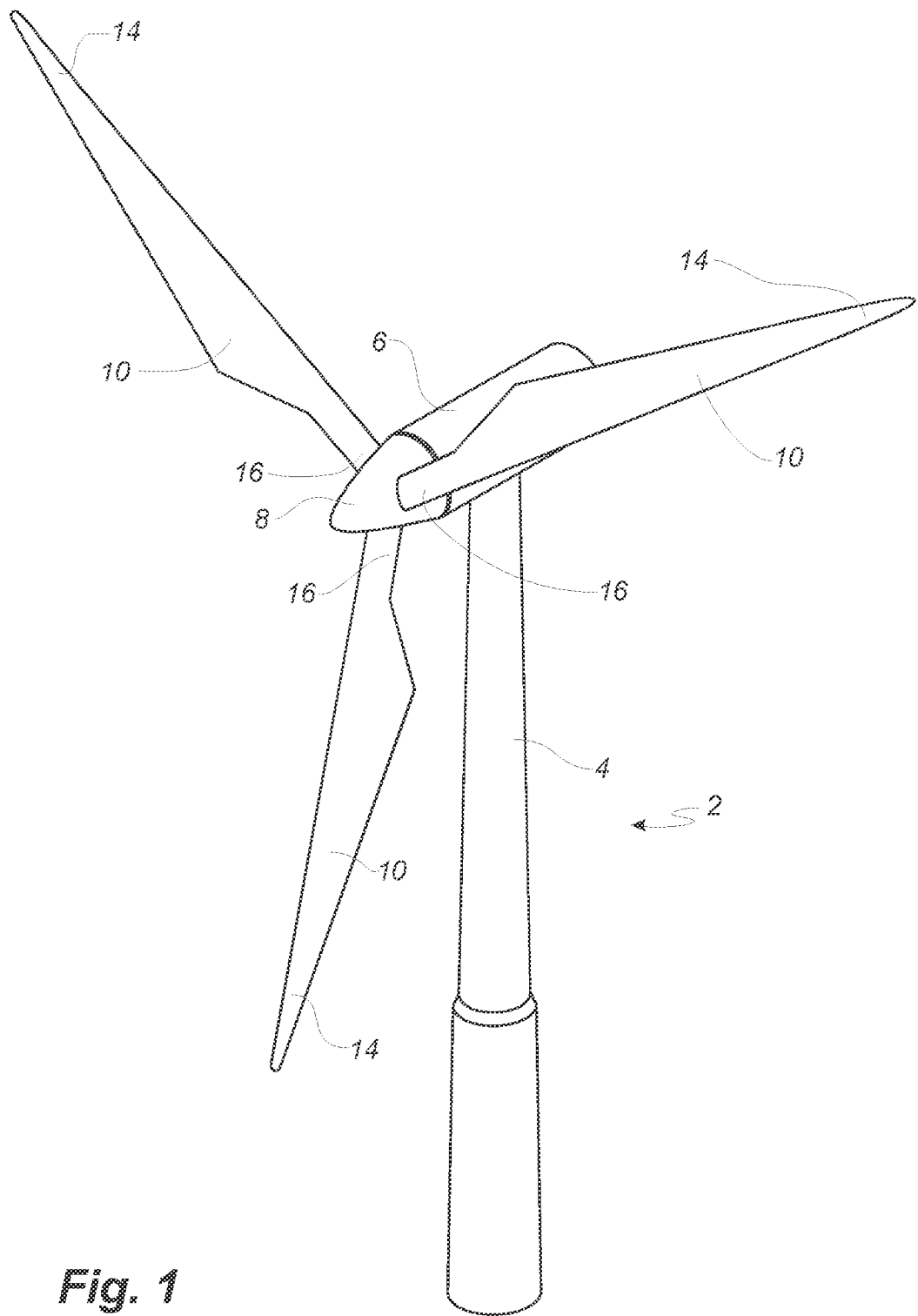
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
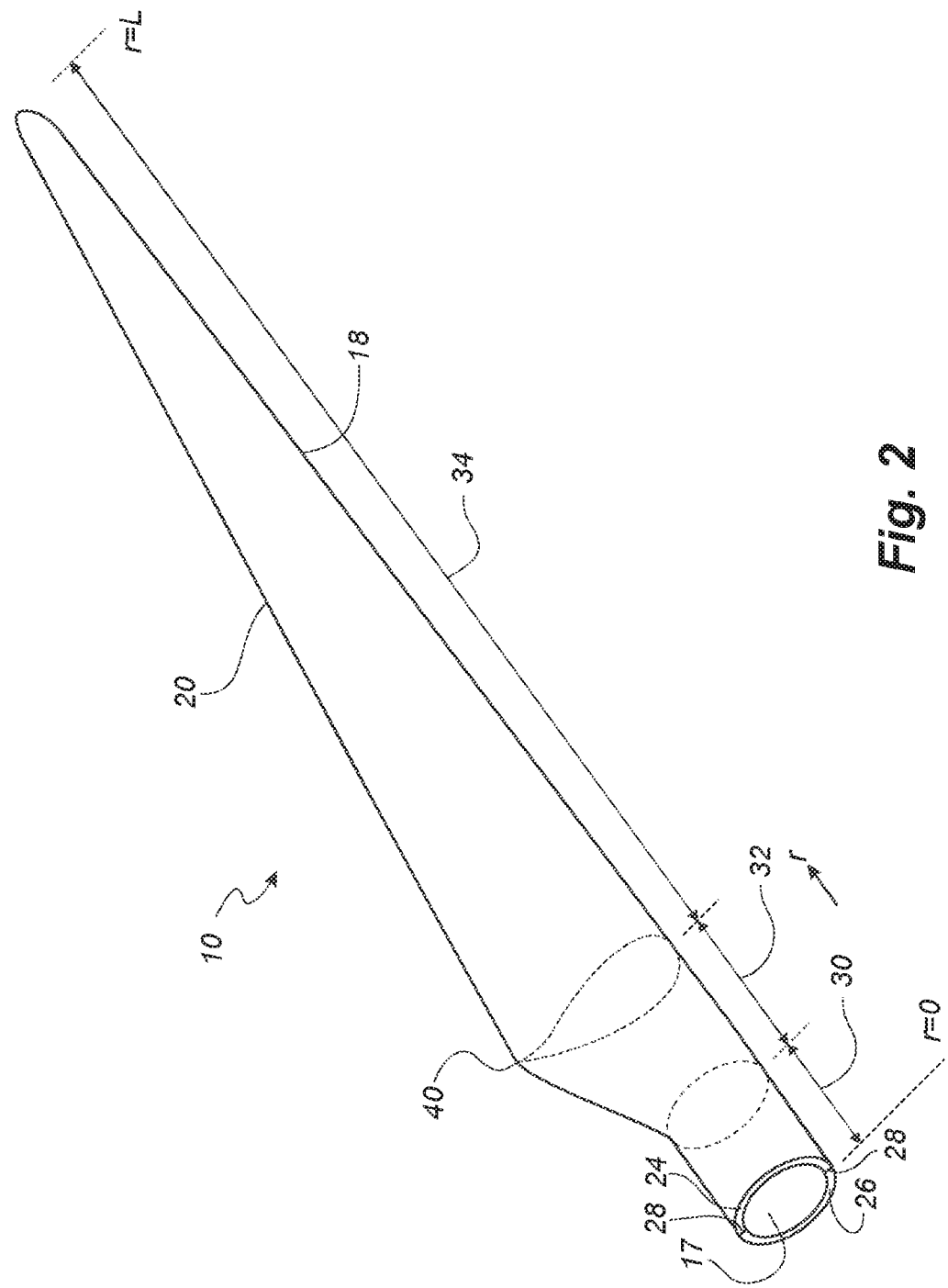
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
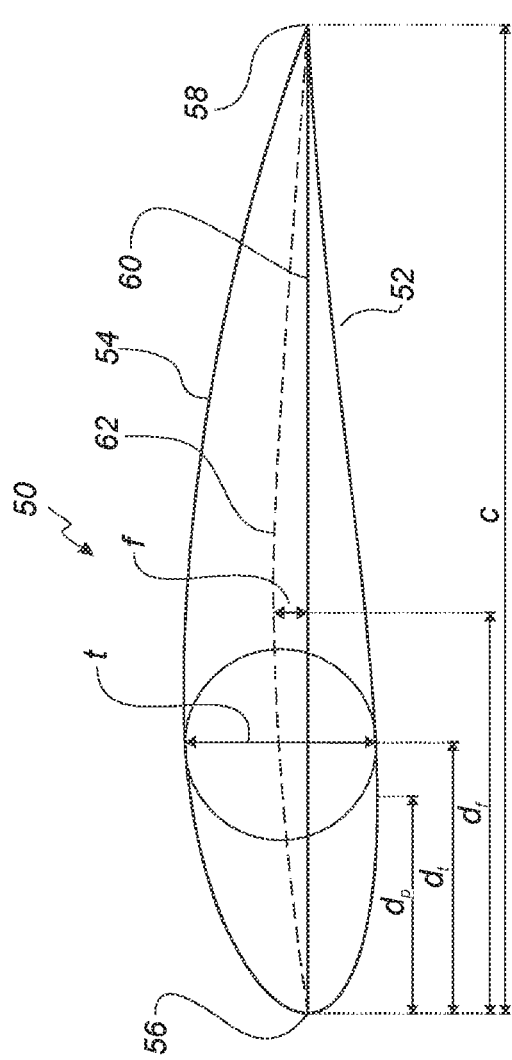
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
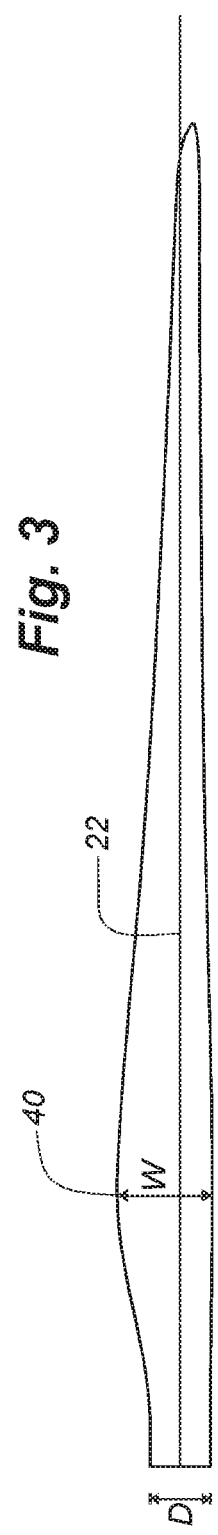
FIG. 4 shows a schematic view of the wind turbine blade of FIG. 2, seen from above and from the side.
Figure 4:
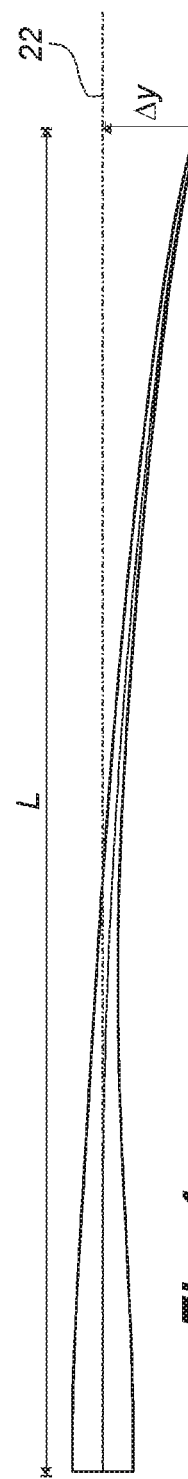
Figure 5:
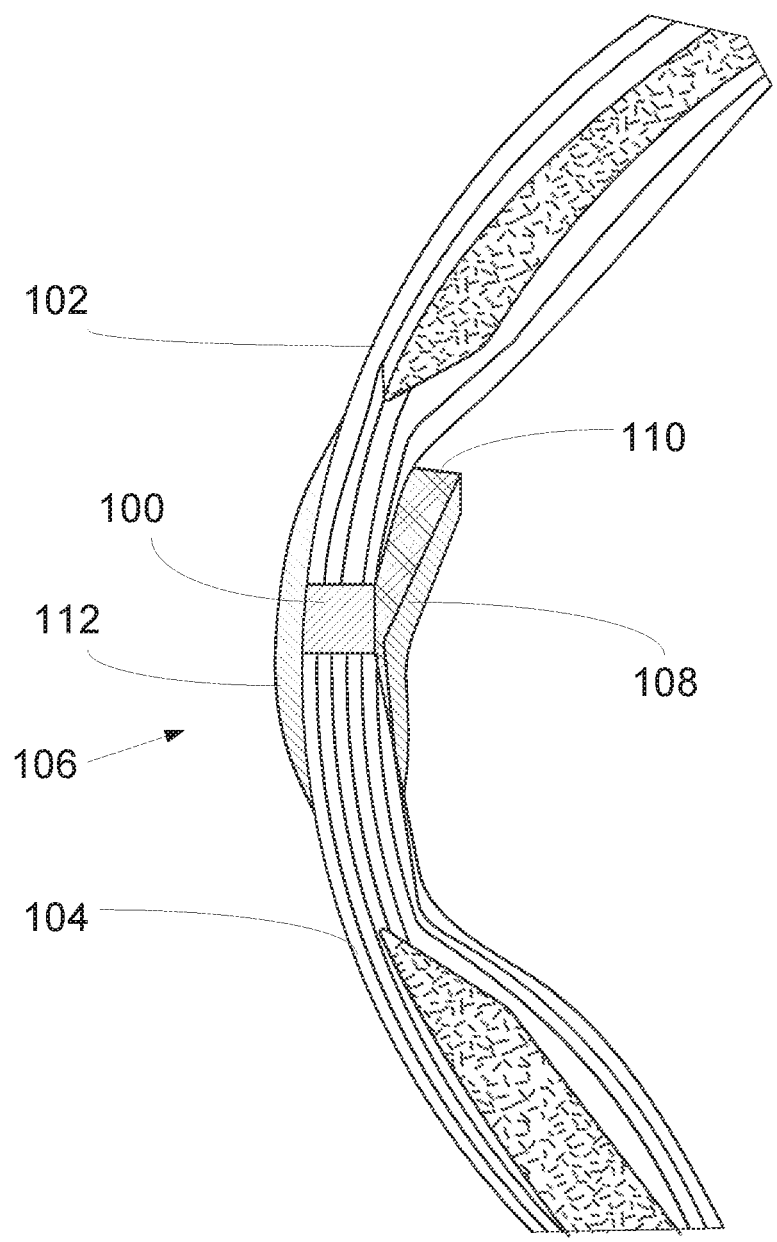
FIG. 5 illustrates an enlarged cross-sectional view of a leading edge adhesive bond for a prior art wind turbine blade.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are attached together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

Figure 6:
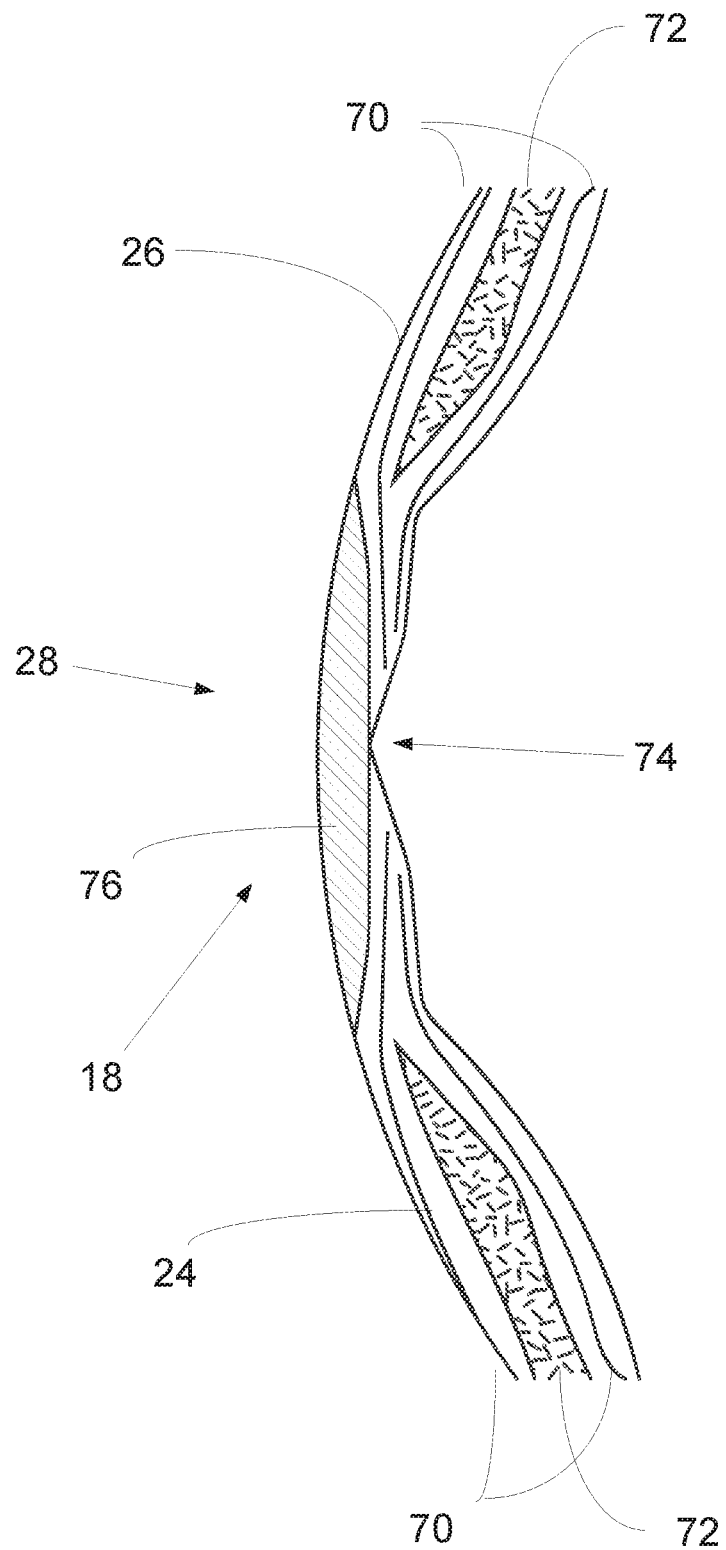
FIG. 6 illustrates an enlarged cross-sectional view of a bond for a wind turbine blade according to the invention, along a wind turbine blade leading edge.

With reference to bond lines 28, an enlarged view of a leading edge bond line according to an aspect of the invention is illustrated in FIG. 6. In this embodiment, the leading edges of the blade shells 24,26 are joined using an overlamination, which eliminates the need for a structural adhesive 100 between the blade shells 24,26.

In this case, it will be understood that the bond line 28 refers to the general area of an overlamination joining the upwind and downwind shells 24,26.

In FIG. 6, the pressure side or upwind shell part 24 and the suction side or downwind shell part 26 meet at the leading edge 18 of the blade 10, in the area of a bond line 28. The shells 24,26 comprise layers or fibre material 70 suspended in a cured resin, which may be applied around portions of a core material 72, e.g. balsa wood, foam, etc. The bodies of the shells 24,26 are tapered in thickness towards the leading edge 18 ends of the shells 24,26, at least along a portion of the leading edge 18.

The shells 24,26 may be integrally formed with such a tapering of the leading edge 18 ends of the shells 24,26, e.g. through the use of suitably-shaped blade shell moulds (not shown) having shell profile surfaces, and/or mould inserts, incorporating a leading edge tapering profile. Additionally or alternatively, the tapering of the leading edge 18 ends of the shells 24,26 may be fully or partially formed through a post-moulding process, e.g. a cutting, grinding or polishing of the leading edge 18 ends of the shells 24,26 after said shells 24,26 have been removed from a blade shell mould (not shown).

Once the shells 24,26 are provided with tapered ends, the shells 24,26 are brought together and closed to form a wind turbine blade 10, such that the leading edge end of the upwind shell 24 abuts the leading edge end of the downwind shell 26, without the presence of a structural adhesive between the shell ends. Accordingly, the tapered leading edge 18 ends of the shells 24,26 come together to form a recess channel 74 along a portion of the leading edge 18 of the blade 10.

An overlamination 76 is applied in the recess channel 74, the overlamination 76 extending between the tapered portions of the upwind and downwind shells 24,26 and acting to join the shell leading edges together. In the embodiment of FIG. 6, the overlamination 76 is selected such that the overlamination 76 substantially fills the recess channel 74 and is flush with the adjacent surfaces of the wind turbine blade shells 24,26, thereby preserving the aerodynamic profile of the leading edge 18 of the blade 10.

The overlamination 76 preferably comprises a plurality of layers of fibre material applied to the leading edge 18 of the blade 10, the layers of fibre material provided in a resin which bonds the layers of fibre material together, while also bonding to the tapered portions of the upwind and downwind shells 24,26.

The overlamination 76 may be provided in the form of separate layers which are subsequently infused with a resin, and/or the overlamination 76 may be provided as a bundle or a stack of layers may be applied as a pre-preg, which may be at least partially infused with an uncured resin, where the pre-preg may be infused with additional resin to bond the overlamination 76 to shells 24,26, wherein the resin is subsequently cured.

Preferably, the overlamination 76 is formed from the same material as the body of the wind turbine blade shells 24,26, e.g. as a glass- and/or carbon-fibre material infused with a suitable resin, e.g. polyester, vinyl ester, epoxy, etc.

The overlamination 76 allows for the blade shells 24,26 to be joined without the use of a relatively heavy and expensive structural adhesive. Furthermore, as the overlamination 76 may be formed from the same material as the body of the blade shells 24,26, accordingly the fault resistance of the leading edge join between the shells 24,26 is increased, as the differences in stiffness levels and other material properties between the shells and the joining material are substantially eliminated.

Preferably, the overlamination 76 can be used in joins between substantially circular-profile portions of the airfoil profile of the wind turbine blade 10, e.g. along the leading edge 18 of the blade 10, and/or along the trailing edge 20 near the root and 16 of the blade 10. It will be understood that the joining method of the invention may be combined with other joining techniques in other areas of the blade, e.g. using structural adhesive between the blade shells.

The step of infusing the overlamination 76 may comprise applying a resin to the surface of a fibre material applied in the recess channel 74, e.g. using a roller application, vacuum infusion, etc. Alternatively, the step of applying a laminate may comprise positioning a precast laminate piece in said recess channel 74, and attaching the laminate piece in said recess channel with a cured resin.

The embodiment of FIG. 6 shows the leading edge 18 ends of the blade shells 24,26 ending in a tapered section. It will be understood that the tapering of the blade shells 24,26 at the leading edge 18 may comprise a full or partial tapering of the thickness of the blade shell body at said ends. In one aspect, the tapering may extend through the body of the blade shells 24,26 to a single layer of fibre material. Additionally or alternatively, the leading edge 18 ends of the shells 24,26 may comprise a stepped tapering or a partial tapering through the thickness of the shell body.

Preferably, the tapering is performed to have a substantially constant cross-section along a portion of the longitudinal length of the blade shells 24,26. Additionally or alternatively, the tapering may be performed in a serrated or zig-zag manner along the longitudinal direction of the blade shells 24,26. Additionally or alternatively, the tapering may be performed in a undulating or wave-like manner along the longitudinal direction of the blade shells 24,26.

The use of a overlamination to join blade shell components allows for the manufacture of a wind turbine blade having reduced use of structural adhesive.

Additionally, the use of overlaminations formed from substantially the same material as the body of the blade shell components themselves results in reduced risk of structural faults along the bond line between components, due to substantially identical stiffness levels and material properties between the shell components and the joining material.

The invention is not limited to the embodiment described herein, and may be modified or adapted without departing from the scope of the present invention.

The invention claimed is:

1. A method of manufacturing at least a portion of a wind turbine blade, wherein the method comprises the steps of:

providing a pressure side blade shell part having a first edge;

providing a suction side blade shell part having a second edge, wherein the first and second edges extend along a spanwise direction of the wind turbine blade; and joining said pressure side blade shell part to said suction side blade shell part along at least a portion of said first edge and said second edge to form a joined leading edge of a closed blade shell, wherein said joining consists of providing an overlamination extending between said first edge and said second edge, such that said joining is performed without a structural adhesive, and wherein said overlamination is applied to external surfaces of said first edge and said second edge, said first and second edges of said pressure side and suction side blade shell parts, respectively, being joined to one another solely by the overlamination along at least a common portion thereof, the closed blade shell comprising the pressure side and suction side blade shell parts, the first edge of the pressure side blade shell part and the second edge of the suction side blade shell part abutting each other at an interface.

2. The method of claim 1, wherein said pressure side and suction side blade shell parts are arranged wherein a recess is defined at the interface between said first edge and said second edge, and wherein said overlamination is received at least partly within said recess.

3. The method of manufacturing at least a portion of a wind turbine blade as in claim 1, wherein the pressure side blade shell part has a first tapered section along at least a portion of an edge of said pressure side blade shell part, the suction side blade shell part has a second tapered section along at least a portion of an edge of said suction side blade shell part, said step of joining said pressure side blade shell part to said suction side blade shell part comprising:

bringing together said pressure side and suction side shell parts such that said first tapered section abuts said second tapered section to form a recess channel located along a boundary between the edges of said pressure side and suction side blade shell parts; and applying the overlamination in said recess channel to join said pressure side and suction side blade shell parts.

4. The method of claim 3, wherein said overlamination is arranged to substantially fill said recess channel.

5. The method of claim 3, wherein said first and second tapered sections are located along the leading edges of respective said pressure side and suction side blade shell parts.

6. The method of claim 3, wherein said first and second tapered sections are located along the respective trailing edges of said pressure side and suction side blade shell parts.

7. The method of claim 6, wherein said first and second tapered sections are located along the respective trailing edges of said pressure side and suction side blade shell parts adjacent the root end of said pressure side and suction side blade shell parts.

8. The method of claim 3, wherein the overlamination is formed from the same material as said pressure side and suction side blade shell parts.

9. The method of claim 3, wherein said step of applying the overlamination laminate comprises:

positioning at least one layer of fibre material along at least a portion of said first edge and said second edge of said pressure side and suction side blade shell parts;

infusing said at least one layer of fibre material with a resin; and curing said resin to bond said pressure side and suction side blade shell parts.

10. The method of claim 9, wherein the at least one layer of fibre material is positioned in the recess channel.

11. A wind turbine blade comprising:

a pressure side blade shell part; and a suction side blade shell part, wherein for at least a portion of a boundary between said pressure side and suction side blade shell parts, said pressure side and suction side blade shell parts are joined by an overlamination to form a joined leading edge of a closed blade shell, without the use of a structural adhesive, wherein joining of the pressure side and suction side blade shell parts consists of the overlamination, and wherein said overlamination is applied to external surfaces of said pressure side and suction side blade shell parts, said pressure side and suction side blade shell parts being joined to one another solely by the overlamination along at least a common portion thereof, the closed blade shell comprising the pressure side and suction side blade shell parts, the pressure side blade shell part and the suction side blade shell part abutting each other at an interface.

12. The wind turbine blade of claim 11, wherein the pressure side blade shell part has a first tapered section along at least a portion of an edge of said pressure side blade shell part, and the suction side blade shell part has a second tapered section along at least a portion of an edge of said suction side blade shell part, wherein said pressure side and suction side blade shell parts are arranged such that said first tapered section abuts said second tapered section to form a recess channel located along a boundary between the edges of said pressure side and suction side blade shell parts, wherein the respective edges of the pressure side and suction side blade shell parts extend along a spanwise direction of the wind turbine blade, and wherein the overlamination is located in said recess channel, said overlamination joining said pressure side and suction side blade shell parts.

13. The wind turbine blade of claim 11, wherein said overlamination is formed from the same material as said pressure side and suction side blade shell parts.

14. The wind turbine blade of claim 11, wherein the wind turbine blade comprises a recess channel extending along at least a portion of the leading edge of said wind turbine blade, wherein the overlamination a laminate is located in the leading edge recess channel and joins said pressure side and suction side blade shell parts along said at least a portion of the leading edge of said wind turbine blade.

15. The wind turbine blade of claim 14, wherein the recess channel extends along an entirety of the leading edge of said wind turbine blade.

16. The wind turbine blade of claim 11, wherein the wind turbine blade comprises a recess channel extending along at least a portion of the trailing edge of the wind turbine blade, wherein the overlamination located in the trailing edge recess channel joins said pressure side and suction side blade shell parts along said at least a portion of the trailing edge of said wind turbine blade.

17. The wind turbine blade of claim 16, wherein the overlamination laminate joins said pressure side and suction side blade shell parts in the root region of the wind turbine blade.

18. A wind turbine comprising at least one wind turbine blade as claimed in claim 11.

19. A method of manufacturing at least a portion of a wind turbine blade, wherein the method comprises the steps of:

providing a pressure side blade shell part having a first edge;

providing a suction side blade shell part having a second edge, wherein the first and second edges extend along a spanwise direction of the wind turbine blade; and joining said pressure side blade shell part to said suction side blade shell part along at least a portion of said first edge and said second edge to form a joined leading edge of a closed blade shell, wherein the joining consists of providing an overlamination extending between said first edge and said second edge, such that said joining is performed without a structural adhesive, and wherein said overlamination is applied to external surfaces of said first edge and said second edge, said first and second edges of said pressure side and suction side blade shell parts, respectively, being joined to one another solely by the overlamination along at least a common portion thereof, the closed blade shell consisting of the pressure side and suction side blade shell parts and the overlamination.

* * * * *